(12) United States Patent
Hoose et al.

(10) Patent No.: US 6,724,533 B2
(45) Date of Patent: Apr. 20, 2004

(54) LAMELLAR GRATING STRUCTURE WITH POLARIZATION-INDEPENDENT DIFFRACTION EFFICIENCY

(75) Inventors: John Hoose, Fairport, NY (US); Robert Frankel, Rochester, NY (US); Evgeny Popov, Marseille Cedex (FR)

(73) Assignee: Chromaplex, Inc., West Henrietta, NY (US)

(*) Notice: Subject to any disclaimer, the term of this patent is extended or adjusted under 35 U.S.C. 154(b) by 126 days.

(21) Appl. No.: 10/062,228

(22) Filed: Jan. 31, 2002

(65) Prior Publication Data

US 2003/0142405 A1 Jul. 31, 2003

(51) Int. Cl.$^7$ .................................. G02B 5/18
(52) U.S. Cl. ............... 359/572; 359/569; 359/566; 359/496; 385/37; 385/24
(58) Field of Search ............... 359/566, 569, 359/572, 576, 496, 497, 15, 34; 385/37, 24

(56) References Cited

U.S. PATENT DOCUMENTS

| | | | |
|---|---|---|---|
| 5,413,884 A | 5/1995 | Koch et al. | |
| 6,275,630 B1 | 8/2001 | Yang et al. | |
| 6,343,170 B1 | 1/2002 | Sela | |
| 6,449,066 B1 * | 9/2002 | Arns et al. | 359/15 |
| 2002/0176124 A1 | 11/2002 | Wise et al. | |
| 2003/0090802 A1 * | 5/2003 | Fabiny et al. | 359/569 |

OTHER PUBLICATIONS

Arns, James A. et al. Volume phase gratings for spectroscopy, ultrafast laser compressors, and wavelength division mutiplexing. *SPIE Proceedings* 3779, 313–323 (1999).

Josse, Michel & Kendall, Don L. Rectangular–profile diffraction grating from single–crystal silicon. *Applied Optics* 19, 72–76 (Jan. 1, 1980).

Roumiguieres, J. L. et al. On the efficiencies of rectangular–groove gratings. *J. Opt. Soc. Am.* 66, 772775 (Aug. 1976).

Nagel, D. J. et al. Spectroscopic Applications of Structures Produced by Orientation–Dependent Etching. *Nuclear Instruments and Methods* 172, 321–326 (1980).

Popov, E. & Mashev L. Back–Side Diffraction by Relief Gratings. *Optics Communications* 65, 97–100 (Jan. 15, 1988).

Tayeb, G. & Petit R. On the numerical study of deep conducting lamellar diffraction gratings. *Optica Acta* 31, 1361–1365 (1984).

Yokomori, Kiyoshi. Dielectric surface–relief gratings with high diffraction efficiency. *Applied Optics* 23, 2302–2310 (Jul. 15, 1984).

* cited by examiner

*Primary Examiner*—Drew Dunn
*Assistant Examiner*—Fayez Assaf
(74) *Attorney, Agent, or Firm*—Ropes & Gray LLP

(57) ABSTRACT

A lamellar volume grating operating in reflection and transmission and providing a substantially wavelength- and polarization-independent diffraction efficiency is disclosed. The lamellar grating has an approximately rectangular grating profile with a height-to-width ratio of the grooves or "teeth" advantageously greater than 2. The grating operates preferably in first order and can be implemented as an immersion grating. In particular, the lamellar volume grating described herein can be employed in an optical multiplexer/demultiplexer arrangement with small overall dimensions.

18 Claims, 10 Drawing Sheets

LAMELLAR GRATING STRUCTURE WITH POLARIZATION-INDEPENDENT DIFFRACTION EFFICIENCY

FIELD OF THE INVENTION

The invention relates to lamellar gratings, and more particularly to lamellar gratings having a substantially polarization-independent diffraction efficiency over a wavelength range useful for optical telecommunication applications.

BACKGROUND OF THE INVENTION

Fiber optic telecommunication systems are increasingly used to provide high-bandwidth transmission of information to homes and businesses. During the past decade, optical networks have become more complex and use multiple wavelengths transmitted simultaneously over the same fiber. This transmission method is referred to as wavelength division multiplexing/demultiplexing (WDM/D). The international telecommunications union (ITU) standards body has proposed a channel allocation grid with 100 GHz channel spacing (~0.81 nm at a 1550 nm wavelength) on even 100 GHz intervals, counting nominally in both directions from a center frequency of 193.1 THz. Newer systems are being designed to reduce the channel spacing to 50 GHz or less. In addition, the total wavelength range over which these devices are designed to operate is increasing. WDM is a general term applied to the separation and integration of information carried on these optical channels. The technologies involved in WDM/D being routed through various devices that deliver the high bandwidth signals to the end customer.

To extract information from WDM channels, the various optical carrier frequencies propagating, for example, in a communication fiber, have to be separated. Wavelength-selective optical elements, such as interference filters, fiber Bragg gratings, arrayed waveguide gratings (AWG), and free space gratings, e.g., surface relief diffraction gratings, are employed for this purpose. Many of these wavelength-selective components have a polarization-sensitive response. The gratings can be ruled gratings, holographic gratings or etched gratings. Gratings may employ a crystalline substrate, such as a Si wafer, that can be processed by conventional semiconductor processing techniques. In particular, grating structures can be formed in Si by preferential etching using an aqueous solution of KOH to expose the Si (111) planes, or by (non-preferential) reactive ion etching which allows the formation of arbitrary grating characteristics.

It is well known that standard single-mode fiber may not preserve the launched state of polarization (SOP) of optical signals propagating through the fiber. Moreover, the SOP usually varies with time at any given point along the fiber due to small changes in the physical environment of the fiber or in the optical wavelengths. These random polarization fluctuations can affect transmission systems that employ polarization-sensitive optical components, such as optical amplifiers, coherent optical receivers or polarization-dependent photonic switches and demultiplexers. Polarization scramblers have recently been employed in optically amplified transoceanic communication systems, where they are used, for example, to eliminate anisotropic gain saturation (polarization hole burning) in the optical amplifiers by depolarizing the launched optical signal. Accordingly, optical components used with optical fibers should be made polarization independent, thereby reducing costs and complexity of the fiber-optic communications system. Moreover, the optical components should be highly efficient to extend the range of data transmission through optical fibers.

It would therefore be desirable to provide compact wavelength-dispersive devices that can separate closely-spaced optical channels with equal efficiency regardless of the polarization direction of the light signal and with high diffraction efficiency.

SUMMARY OF THE INVENTION

The invention is directed, among other things, to lamellar immersion gratings with a high dispersion for wavelength-dispersive applications, such as wavelength filtering, wavelength tuning and wavelength multiplexing/demultiplexing for optical communication systems. The gratings are designed to provide high efficiency single mode (or single propagating order) diffraction in both TM and TE polarizations with a diffraction efficiency that is essentially wavelength-independent over a selected communication channel, such as the C-band between 1530 and 1565 nm. The high dispersion design makes possible small standalone mux/demux components and integrated subcomponents that can be easily manufactured.

According to one aspect, the lamellar grating is implemented in Si, which is transparent in the infrared portion of the spectrum of interest. The lamellar structure can be fabricated by standard semiconductor processing techniques, such as wet etching, ion beam etching or reactive ion etching. The grating can be operated in reflection or in transmission. If the grating is operated in reflection, it may be operated either in Littrow, or in non-Littrow, where the light exits the grating at an angle substantially different from the entrance angle. The non-Littrow configuration has advantages in certain applications, for instance when double pass operation of the grating is desired. The lamellar structure may be composed of alternating "teeth" and grooves which together define a grating period. For example, when using a Si wafer as substrate for the grating, the grooves would be etched, leaving the "teeth" which are hence formed of the semiconductor material. The grooves can be filled with a dielectric or a metal having a refractive index different from that of the substrate or "teeth." Instead of filling the grooves, the "teeth" can also be coated with a material having a different dielectric constant or refractive index. It will be understood that the actual diffraction properties of the grating will depend on the dimensions and the refractive indices of the substrate and groove fill material.

The gratings are preferably operated in first order. However, the gratings can also be operated at higher diffraction orders. A grating will typically operate in a low diffraction order if the grating period is comparable to, e.g., within a factor of 2, of the wavelength of the light propagating in the medium in which the grating is formed.

According to another aspect of the invention, a lamellar grating is formed or disposed on a surface of a prism with a high index of refraction, such as Si. The grooves of the grating are filled with a material having a lower index of refraction, such as polymer or glass (n~1.5). Optionally, a second prism is attached to the grating surface of the first prism. This arrangement has small dimensions due to the large index of the semiconductor (Si) prism and can advantageously be incorporated in an optical connector.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to a lamellar volume grating operating in reflection and transmission and providing substantially equal diffraction efficiency TE and TM polarization directions. In particular, the lamellar volume grating described herein can be employed in an optical multiplexer/demultiplexer arrangement.

Figure 1:
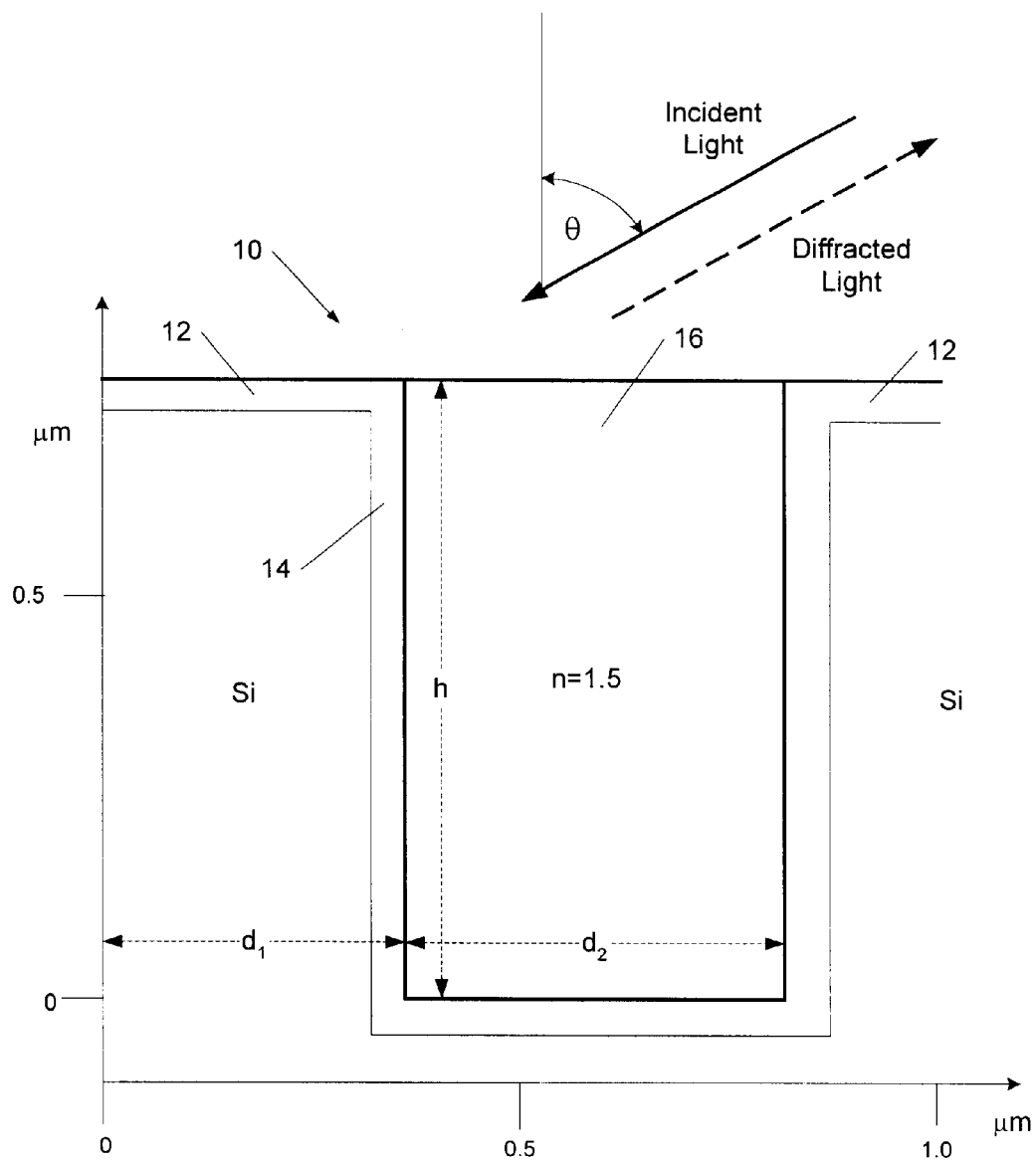
FIG. 1 is a cross-sectional view of a lamellar reflection grating having alternating metal and glass regions.

FIG. 1 shows schematically in cross-section an exemplary lamellar grating structure 10, nominally rectangular, or quasi-rectangular. The depicted grating design can be implemented in silicon and has raised portions 12 with a height of h=0.75 μm and a width of $d_1$=0.36 μm. The raised portions 12 can be provided with a sufficiently thick gold coating 14 so as to be deemed opaque over the intended optical wavelength range. Alternatively, the raised portions 12 could be made entirely from gold. The grooves 16 disposed between the raised portions 12 have a width of $d_2$=0.48 μm and are filled in with a transparent material having a refractive index of ~1.5, such as glass. The height-to-width ratio $d_2$/h of the grooves is 2.4 and the groove frequency $$\frac{1}{d_1 + d_2}$$

is approximately 1200 grooves/mm.

Figure 2:
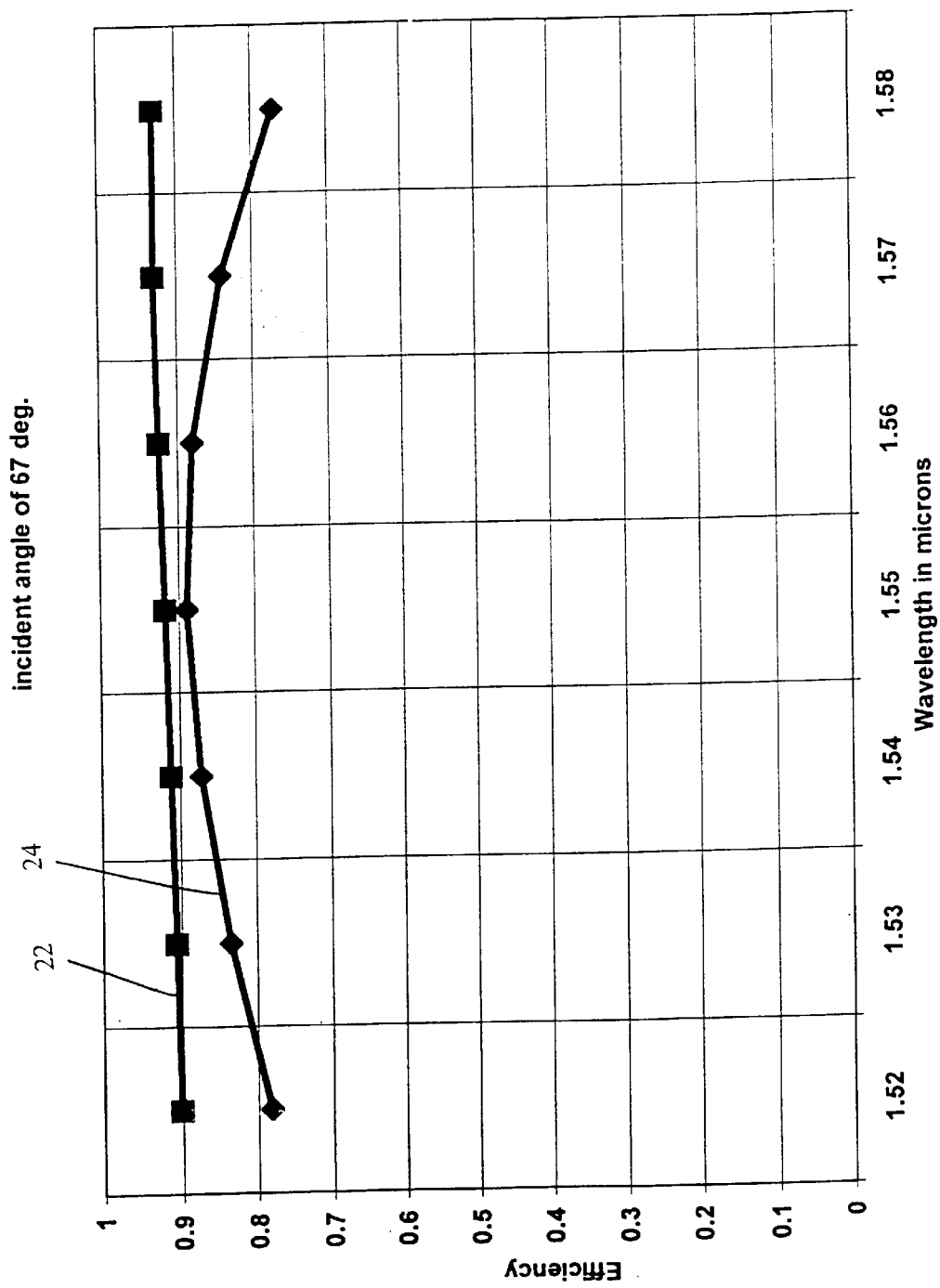
FIG. 2 shows the diffraction efficiency for the grating of FIG. 1.

FIG. 2 shows the diffraction efficiencies for the $1^{st}$ order TE mode 22 and the $1^{st}$ order TM mode 24. The diffraction efficiencies for these TE and TM modes are approximately identical and substantially independent of wavelength between 1.52 and 1.58 μm, which corresponds to the C-band in optical communication. Surprisingly, at an angle of incidence of approximately 67°, there is very little loss from the Fresnel reflections one might otherwise expect at an air/gold and air/glass interface illuminated at ~70°. A grating of this type can be manufactured using conventional semiconductor manufacturing techniques. The term "substantially independent" is to be understood as representing a diffraction efficiency that is within ±5% to ±10% of an average value in the wavelength range of interest.

Figure 3:
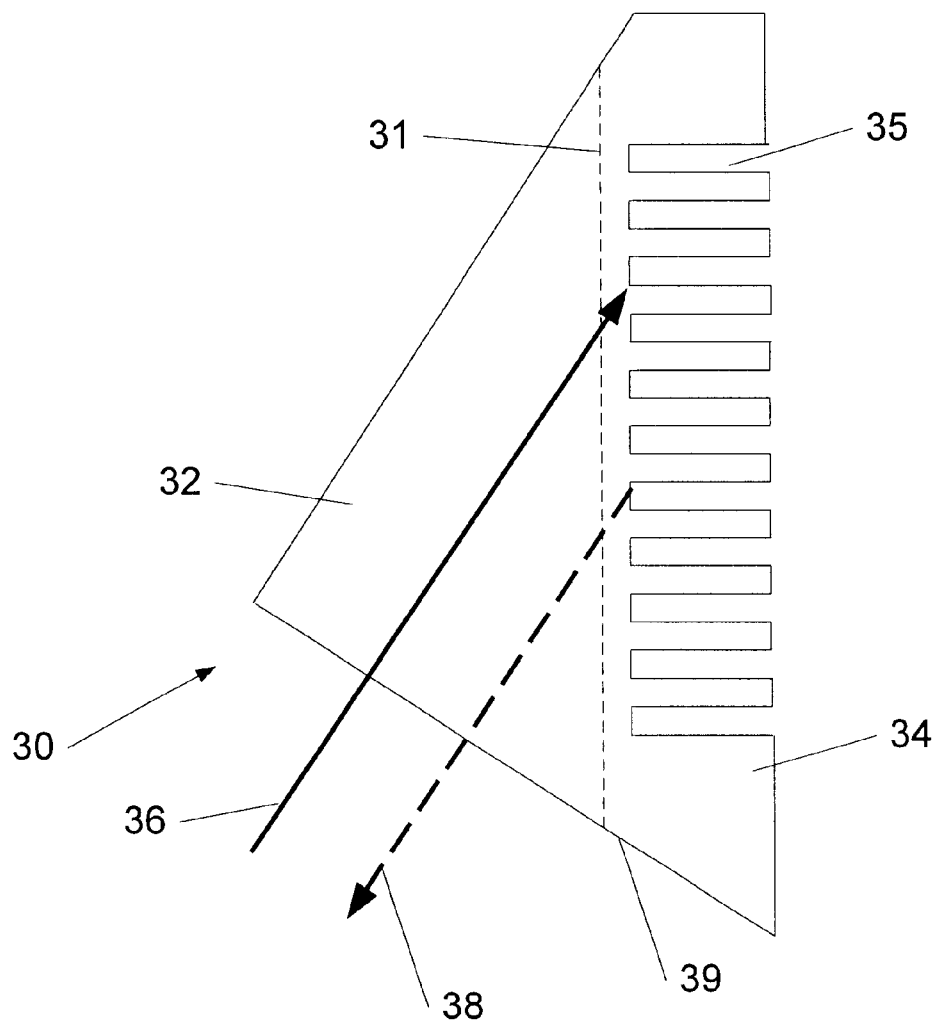
FIG. 3 is an embodiment of a lamellar reflection grating with alternating silicon and gold regions implemented as an immersion grating in Littrow configuration.

FIG. 3 shows a lamellar immersion grating structure 30 operating in Littrow configuration. The grating 34 can fabricated in crystalline silicon, and the grooves 35 can be filled and/or coated with a dielectric or a metal, such as gold. The exemplary grating device 30 has the form of a prism 32, with light 36 entering the prism through the prism entrance face 39 at approximately normal incidence. This arrangement hence can substantially reduce and even eliminate polarization-dependence of the reflectivity at the entrance face 39. The grating profile of the rectangular volume grating 34 can be fabricated directly on one of the prism faces, for example, by reactive ion etching. Alternatively, the grating structure can be fabricated on a separate semiconductor wafer, for example, a Si wafer, that is subsequently bonded to the prism face 31, either with the surface of the wafer with the formed grating structure or with the unprocessed wafer surface facing the prism face 31. Methods for bonding materials, for example, by using an index-matching adhesive, are known in the art. Wafer bonding techniques, which rely on van der Waals forces between two flat surfaces in close contact, can also be used. The entering light beam 36 is diffracted by the grating 34, preferably in a low order, such as in first order, and exits through the prism face 39 as diffracted beam 38 also at approximately normal incidence.

Figure 4:
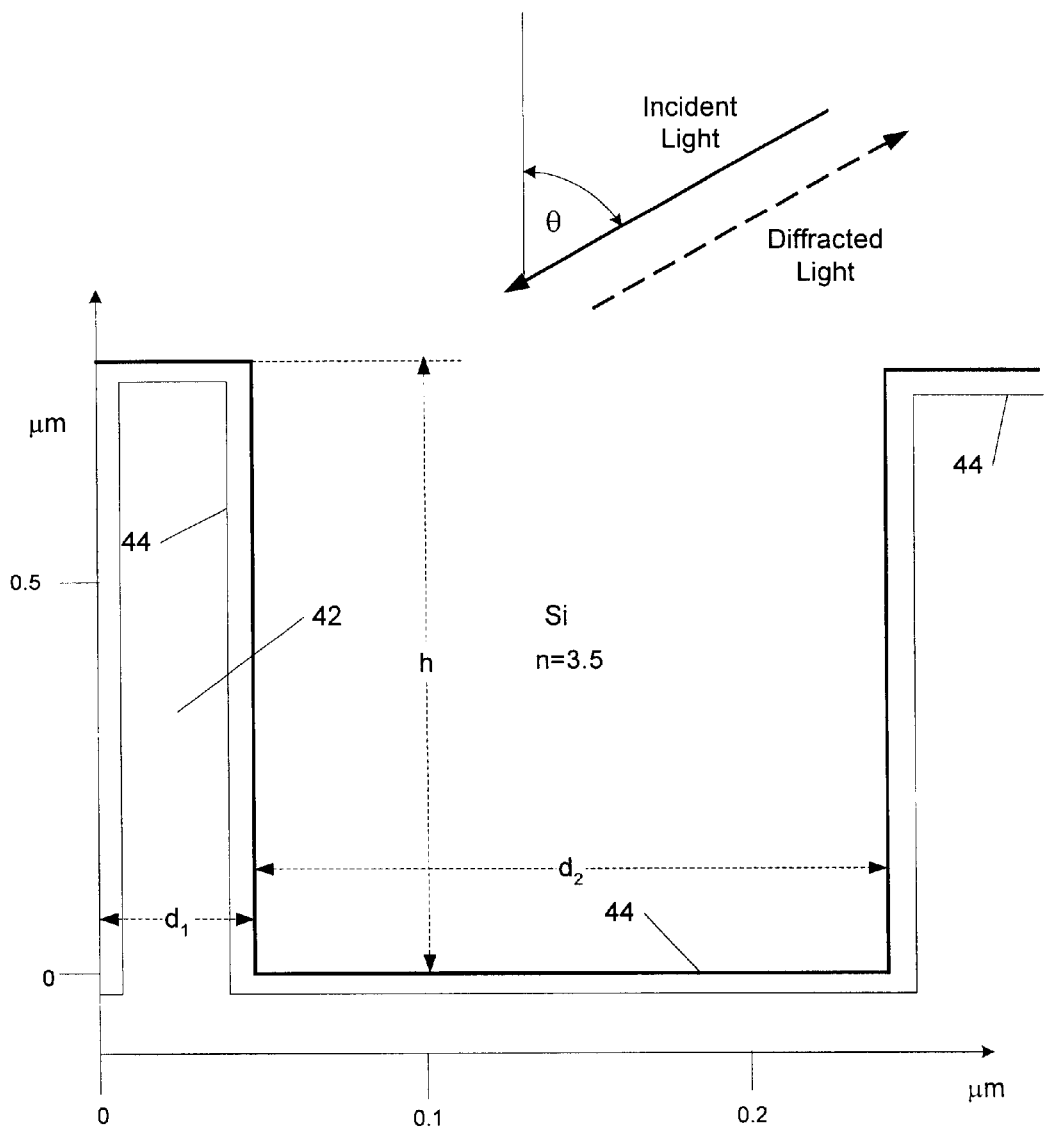
FIG. 4 is a cross-sectional view of the immersion grating of FIG. 3.

FIG. 4 shows a cross-sectional view of an exemplary lamellar immersion grating fabricated in silicon with a grating period of $d_1+d_2$=0.23 μm, corresponding to 4268 grooves/mm. Rectangular grooves 42 having a width of $d_1$=0.047 μm and a depth of h=0.61 μm are etched into the Si crystal or wafer, giving a height-to-width ratio of the rectangular grooves of h/$d_1$=13. The grating is used in reflection and the grating surface (facing downward in FIG. 4) is coated or filled with a conductive material 44, for example gold.

Figure 5:
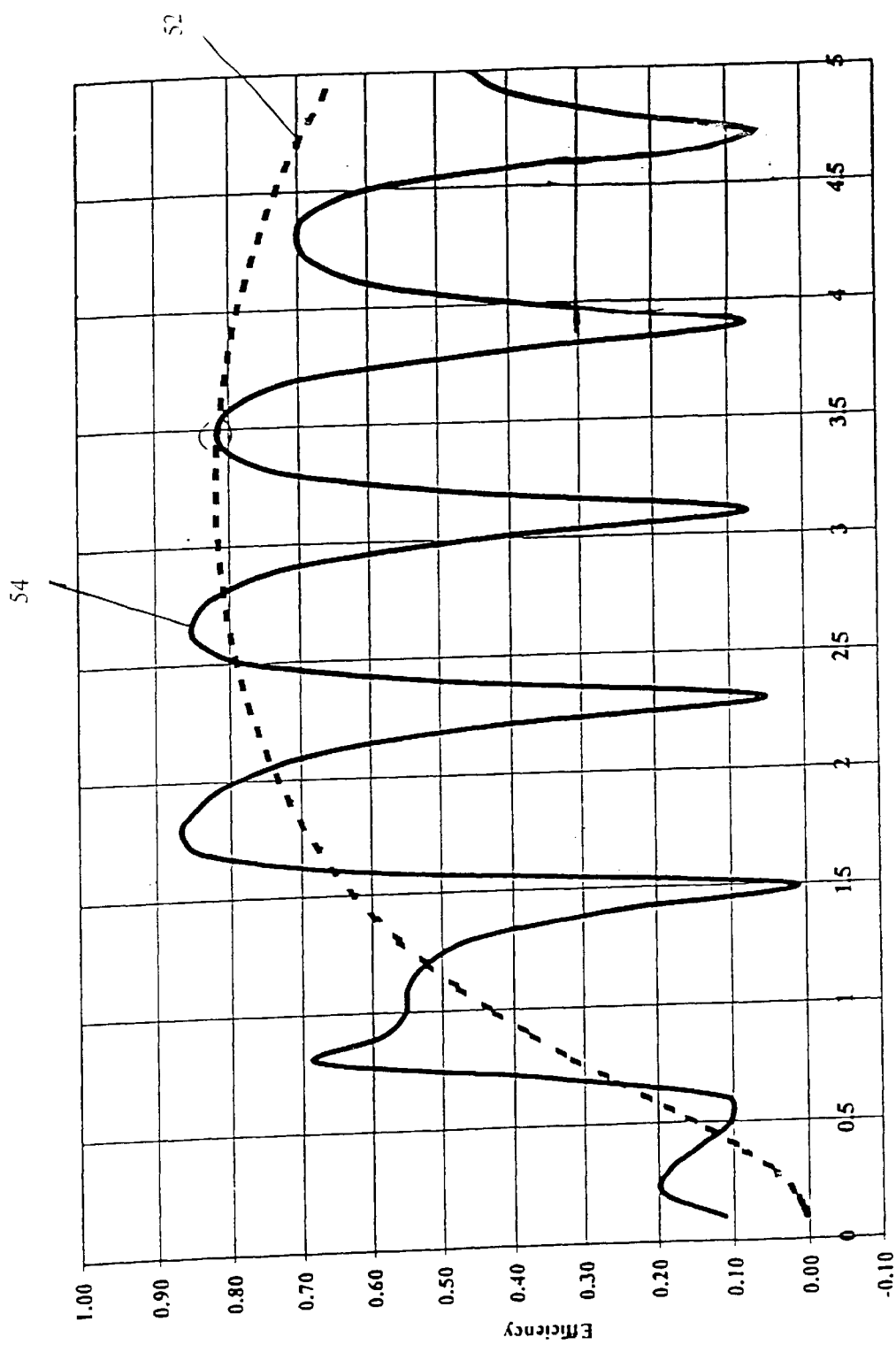
FIG. 5 shows the diffraction efficiency for TE and TM modes as a function of height-to-width ratio for the grating of FIG. 4.
Figure 6:
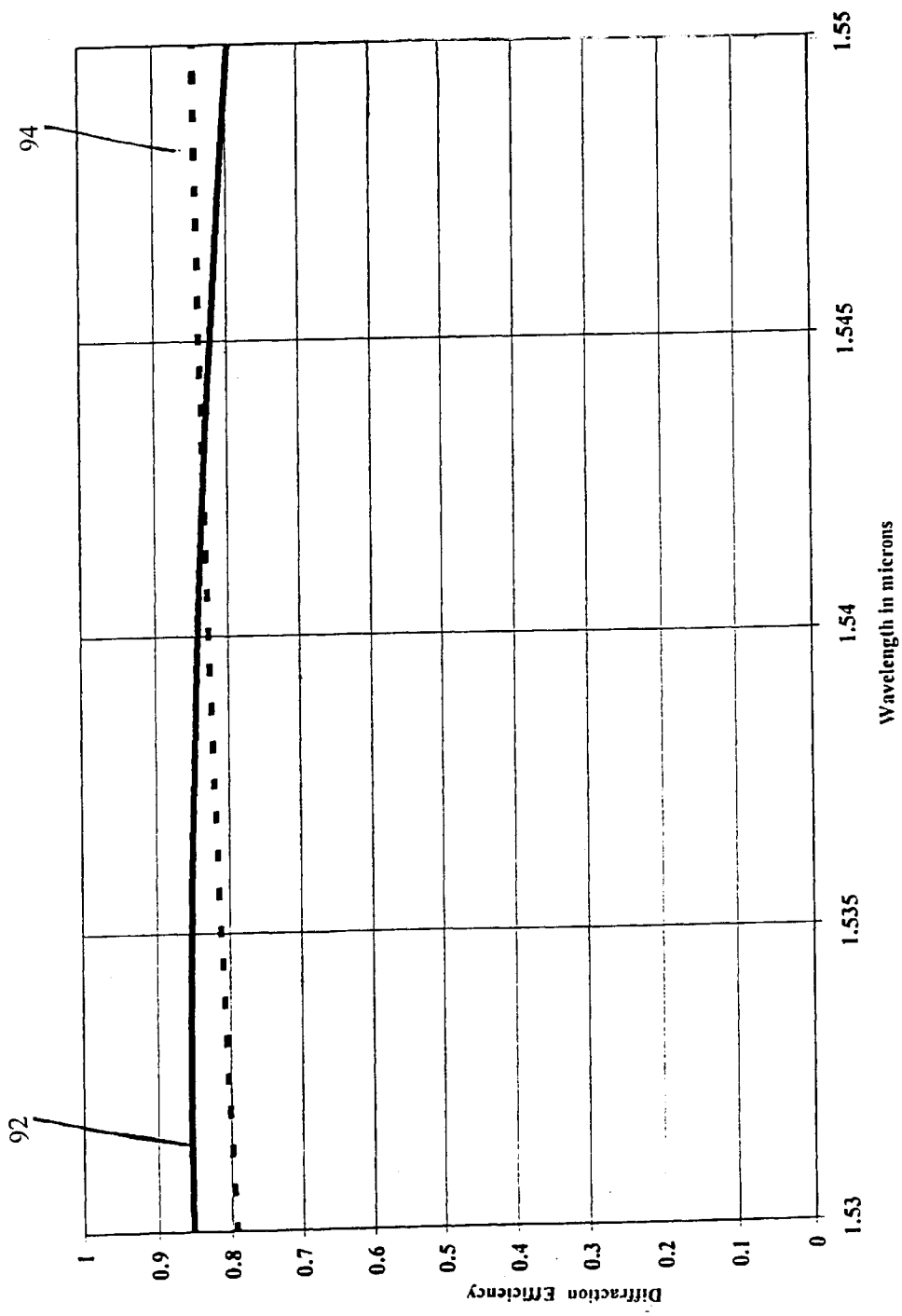
FIG. 6 shows the diffraction efficiency across the C-band for h/d=3.5 of the grating of FIG. 4.

Referring now to FIG. 5, a suitable h/$d_1$ ratio was selected by calculating the diffraction efficiency for the TE and TM mode for $1^{st}$ order diffraction as a function of h/$d_1$. It was experimentally observed that an advantageous operating point over the wavelength range of interest has an h/d value which is moved to a lower h/$d_1$ value by one maximum of the TM curve 54 from the value where the TE 52 and the TM 54 diffraction efficiencies overlap. The corresponding TE 62 and TM 64 diffraction efficiencies between λ=1.53 μm and 1.55 μm (C-band) are illustrated in FIG. 6. As in the first example, the diffraction efficiency is >0.8 and substantially wavelength-independent for both the TE and TM polarization directions.

Figure 7:
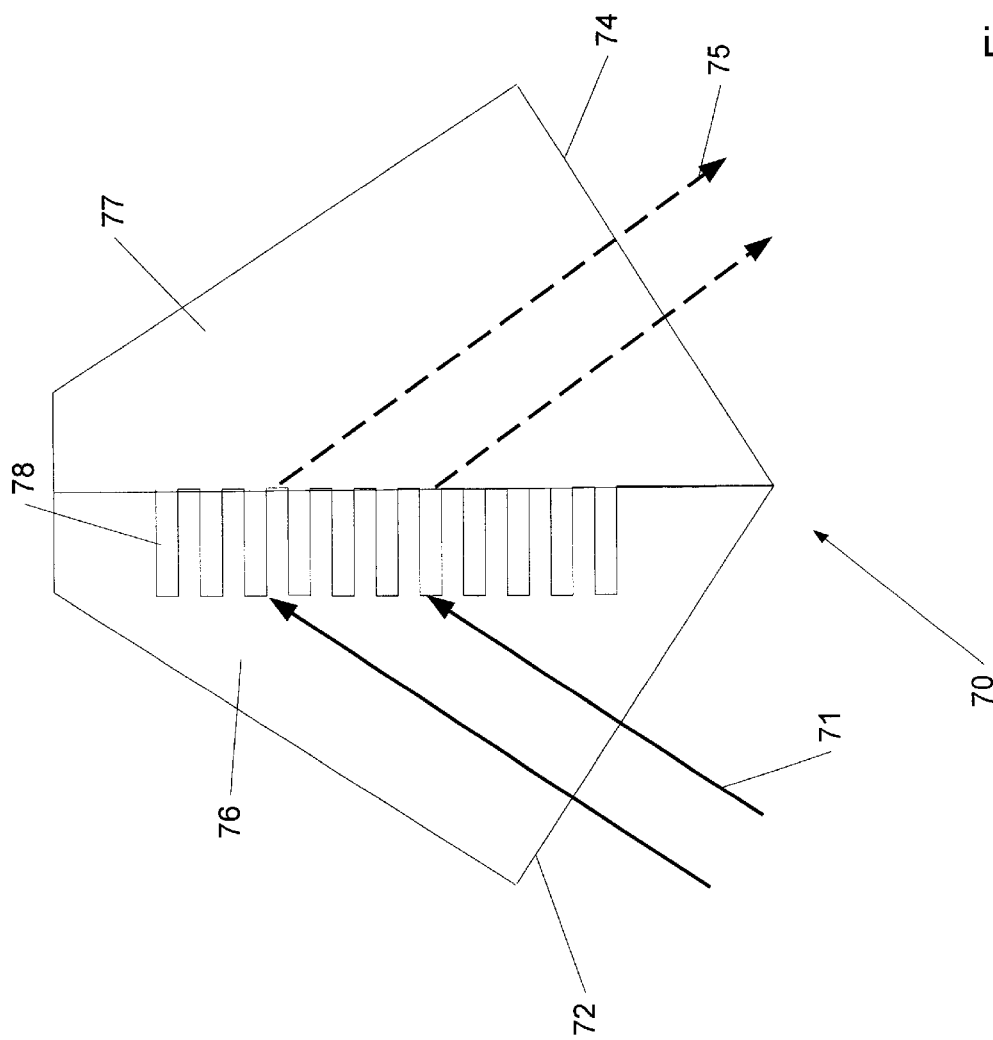
FIG. 7 is another embodiment of a lamellar transmission grating with alternating silicon and glass regions operating in transmission.

FIG. 7 depicts a different embodiment of a grating device 70, wherein a lamellar immersion grating 78 operating in transmission is formed inside a double prism structure 76, 77. The double prism structure can advantageously be made of a material with a high refractive index, such as silicon with a refractive index of 3.5. The grooves of the lamellar grating can be filled with a dielectric material, such as glass (n~1.5), or another material with a low refractive index. Polarization-dependence of the optical losses at the entrance face 72 and exit face 74 of the double prism structure 76, 77 can be eliminated by passing the incident light 71 and the diffracted light 75 through the entrance and exit faces at approximately normal incidence. In the event that the diffraction efficiency of the grating is still substantially independent of the wavelength, but slightly different for TE and TM polarization, the prism faces 72, 74 can be oriented so that the incident and/or diffracted light passes through the entrance and exit faces of the prism at non-normal incidence, causing the transmission to be different for TE and TM modes, as is known from electromagnetic theory.

Figure 8:
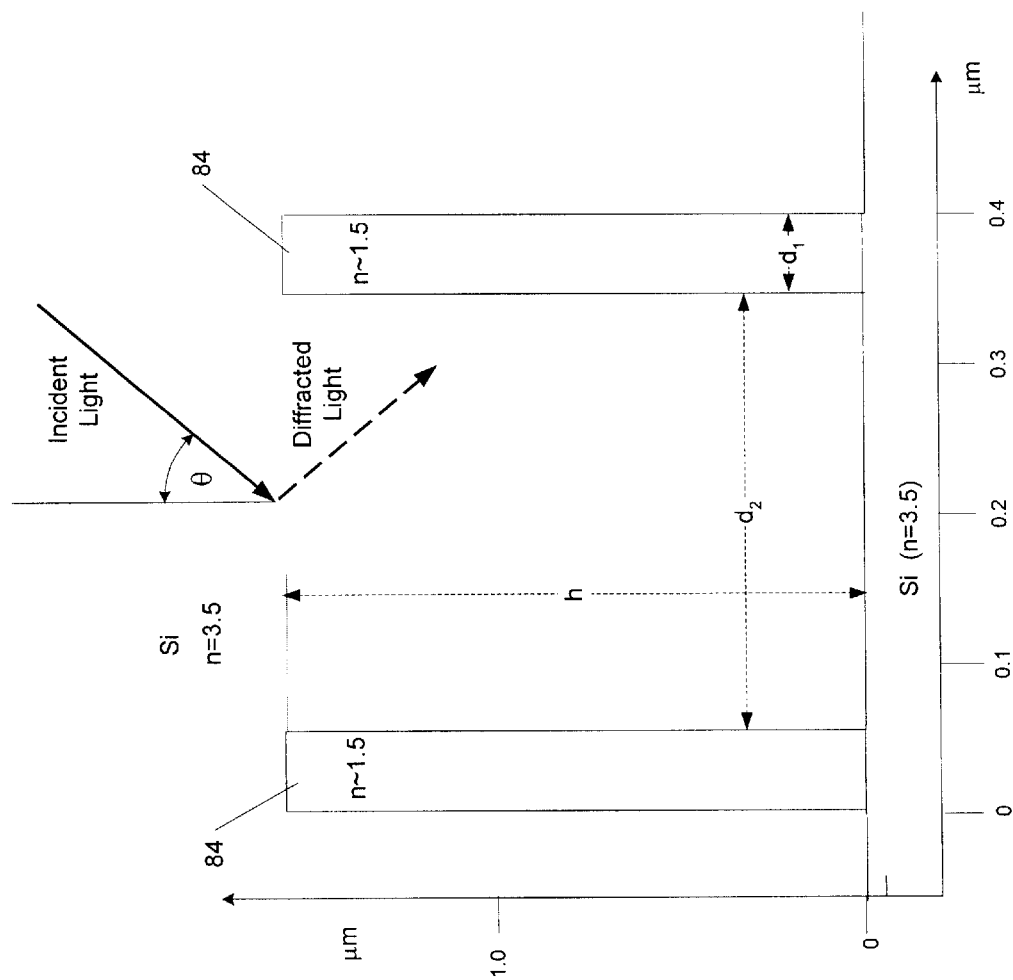
FIG. 8 is a cross-sectional view of the transmission immersion grating of FIG. 7.

FIG. 8 shows a detailed cross-sectional view of the lamellar grating of the double prism structure of FIG. 7 that provides a high polarization-independent diffraction efficiency. The grating is made of silicon and has a grating period of $d_1+d_2=0.34$ μm, corresponding to 2900 grooves/mm. An angle of incidence of $\theta=40°$ is selected. Rectangular grooves 84 having a width of $d_1=0.05$ μm and a depth of $h=1.35$ μm are etched into the Si crystal, resulting in a height-to-width ratio of $h/d_1=27$. The grooves in the illustrated exemplary embodiment are filled with a material with an index of refraction of approximately 1.5, for example glass. However, other materials, such as a polymer, $Si_3N_4$, and the like can also be used.

Figure 9:
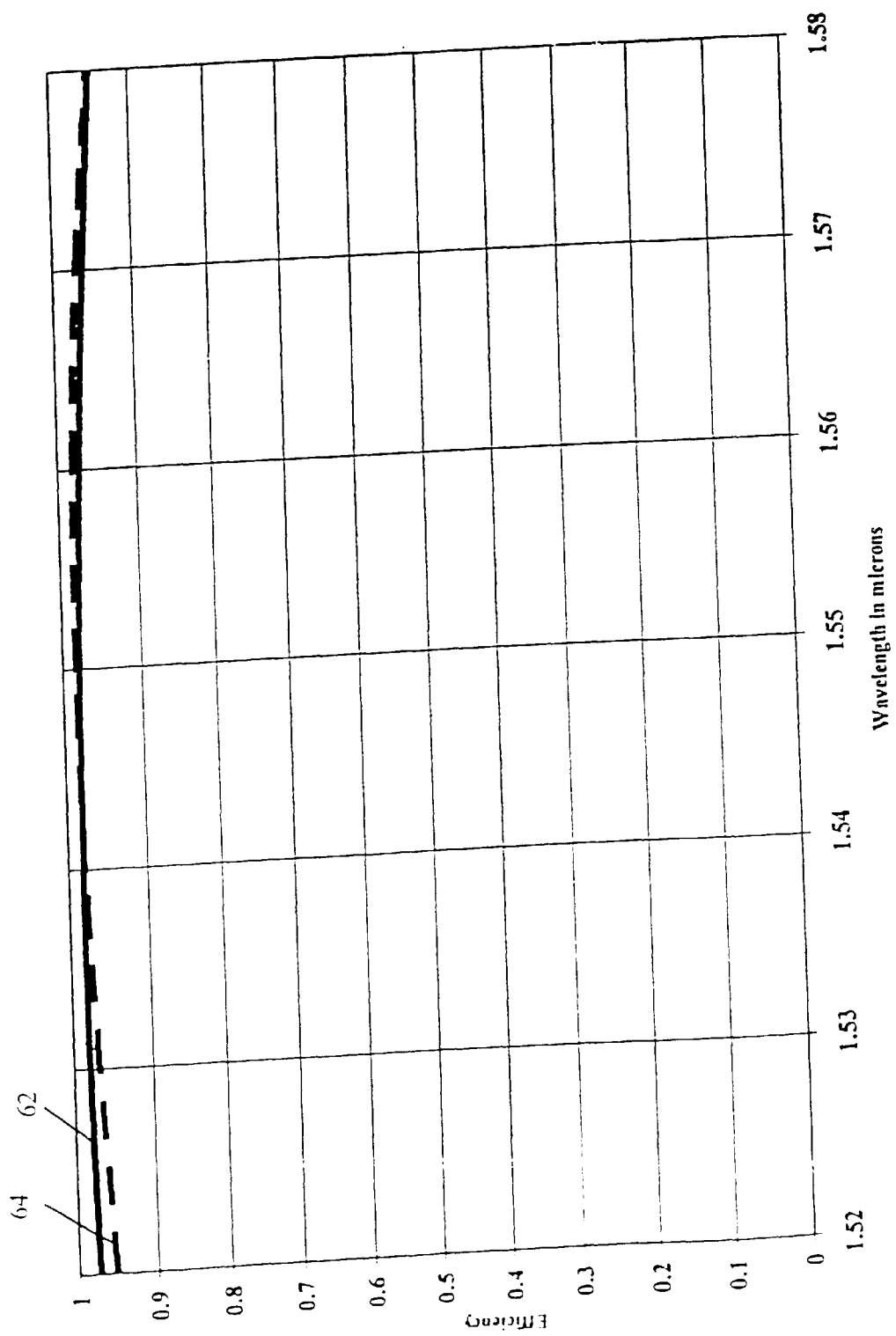
FIG. 9 shows the diffraction efficiency for the grating of FIG. 7.

The TE (solid line 92) and the TM (dotted line 94) diffraction efficiencies in the wavelength range between $\lambda=1.52$ μm and 1.58 μm are illustrated in FIG. 9. As in the previously described embodiments, the h/d ratio was selected by calculating the diffraction efficiency as a function of h/d for the TE and TM mode in $1^{st}$ order and selecting as an operating point an h/d value just below the h/d value where the TE and the TM diffraction efficiencies intersect for the wavelength range of interest. By selecting the grating profile depicted in FIG. 8 with the double prism structure of FIG. 7, the diffraction efficiencies of both TE and TM polarizations approach 100% over this wavelength range and are essentially independent of the wavelength.

Figure 10:
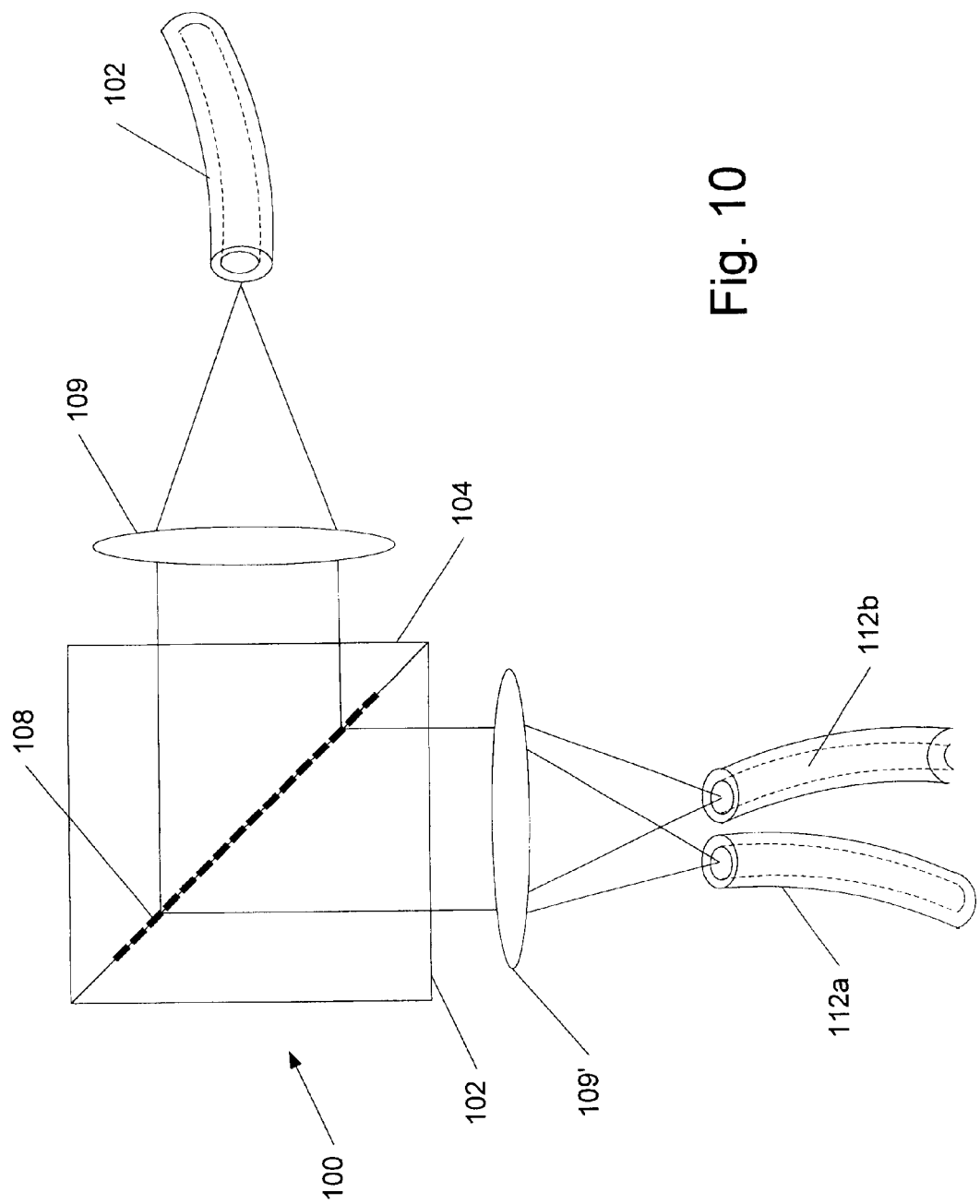
FIG. 10 shows schematically a multiplexing/demultiplexing (DeMUX) connector employing the grating structure of FIG. 7.

Referring now to FIG. 10, the double prism grating structure depicted in FIG. 7 can advantageously be incorporated in a fiber connector 100 with built-in wavelength multiplexing and demultiplexing capability (DeMUX).

In operation, when the connector 100 operates as a demultiplexer, an optical beam containing a plurality of wavelengths is transmitted to the device by a pre-designated optical fiber 102. The divergence of the beam depends on the numerical aperture of the input fiber 102 whose end is located in the vicinity of the focal point of the collimating lens 109 which has sufficient numerical aperture to accept the diverging beam from the optical fiber 102. The beam thus is substantially collimated by the lens and then passes through the entrance face 104 and impinges on the lamellar grating 108. The individual wavelengths within the incident beam are diffracted and angularly separated by the lamellar grating 108 according to their wavelengths. The spatially separated beams then pass through the exit face 102 and are focused by the focusing lens 109' onto exit ports, for example, a series of spaced-apart optical fibers 112a, 112b, detectors, or other suitable optical/electrical devices known in the art.

When the connector 100 operates as a multiplexer, the aforementioned beam path is reversed and the beam would be propagating in the reversed directions when compared to the demultiplexer mode. In this case, all the different wavelengths from the series of optical fibers 112a, 112b are collected by the lens 109' and diffracted by the lamellar grating 108 with specific angular orientations according to the individual wavelengths. The diffracted beams are then combined into a series of substantially overlapping collimated beams regardless of their wavelengths. These beams are essentially one beam that contains all the wavelengths and are focused onto the optical fiber 102 by focusing lens 109.

It may also be advantageous to operate with only one lens as input that focuses "through" the grating and images the diffracted light onto the output fibers, or detectors located on the device to which the connector is mated. Although the aberrations are higher than in the case where two lenses are used, there may be situations where imaging into single mode devices is not required and therefore larger focal spots may be accommodated.

It will be understood that optical fibers as well as inputs/outputs of optical integrated circuits can be arranged in the focus spots.

The aforedescribed arrangement of the grating inside a prism structure and the use of a prism material with a large index of refraction (Si; n=3.5) accompanied by a higher angular dispersion reduces the size of the device. In addition, the use of semiconductor processing technology contributes to an overall reduction of the manufacturing cost. For example, a currently employed DeMUX device with a free space grating has a length of approximately 15–25 cm and a diameter of 2.5–5 cm, whereas an arrayed waveguide device measures 10×10×2 cm, in both cases without the connector. The DeMUX device depicted in FIG. 10 can be fabricated with dimensions of approximately 2 cm×2 cm×1 cm.

While the invention has been disclosed in connection with the preferred embodiments shown and described in detail, various modifications and improvements thereon will become readily apparent to those skilled in the art. For example, although the exemplary lamellar volume gratings described above were implemented in a high refractive index substrate such as Si, these gratings can also be fabricated in glass or in another suitable material that is optically transparent over the wavelength range of interest. The disclosed lamellar gratings can also find applications for spectral analysis and laser wavelength tuning. Accordingly, the spirit and scope of the present invention is to be limited only by the following claims.

What is claimed is:

1. A grating device comprising:
    a volume grating produced in a free surface of a substrate and having a grating period,
    the grating period comprising a first region having a first refractive index of the substrate and a second region having a second refractive index different from the first refractive index, and
    an optically transparent element contacting the free surface of the material which includes the volume grating,
    wherein the substrate is in the form of a prism and the volume grating is produced on an exit face of the prism.

2. The grating device of claim 1, wherein the volume grating is a lamellar grating.

3. The grating device of claim 2, wherein the lamellar grating comprises a plurality of grooves having a substantially rectangular cross section.

4. The grating device of claim 1, further comprising a second optically transparent element in the form of a prism contacting another free surface of the substrate opposite the free surface having the volume grating.

5. The grating device of claim 1, wherein the substrate is selected from the group consisting of semiconductor and insulator.

6. The grating device of claim 5, wherein the semiconductor is selected from the group consisting of II–VI, III–V and group IV semiconducting materials.

7. The grating device of claim 6, wherein the semiconductor is crystalline silicon.

8. The grating device of claim 1, wherein the optically transparent element comprises a second prism.

9. A wavelength-dispersive element comprising:

a first prism having an entrance face and a first contact face;

a second prism having an exit face and a second contact face;

a volume grating produced on one of the first contact face and the second contact face;

wherein optical radiation impinging on the entrance face is diffracted by the grating towards the exit face with a diffraction efficiency that is substantially independent of the polarization direction of the impinging optical radiation over a predetermined wavelength range.

10. The wavelength-dispersive element of claim 9, wherein the volume grating has a pattern alternating between a raised portion and a groove portion, with a combined length of the raised portion and the groove portion defining a grating period, wherein the groove portion is one of filled or coated with a material having a complex refractive index, wherein the real part of the complex refractive index is smaller than the real part of a refractive index of the material forming the raised portion and wherein the grating period is comparable to the wavelength of the optical radiation propagating in the prism.

11. The wavelength-dispersive element of claim 10, wherein when viewed in cross section, the raised portion is shaped as a rectangle and the material filling or coating the groove portion is an optically transparent dielectric material or a metal.

12. The wavelength-dispersive element of claim 11, wherein an aspect ratio of the rectangle is greater than one.

13. The wavelength-dispersive element of claim 10, wherein the grating period is selected so that radiation entering the entrance face of the first prism is diffracted by the grating in a low diffraction order.

14. The wavelength-dispersive element of claim 13, wherein the grating period is selected so that radiation entering the entrance face of the first prism is diffracted by the grating at most in a second diffraction order.

15. The wavelength-dispersive element of claim 14, wherein the grating period is selected so that radiation entering the entrance face of the first prism is diffracted by the grating only in first order.

16. A method of manufacturing a wavelength-dispersive grating element, comprising:

producing a volume grating on a contact surface of a first prism; and bonding a contact surface of a second prism to the contact surface of the first prism that includes the volume grating.

17. The method of claim 16, wherein the contact surface of the second prism is bonded to the contact surface of the first prism with an adhesive.

18. The method of claim 16, wherein the contact surface of the second prism is bonded to the contact surface of the first prism through molecular forces.

* * * * *